United States Patent [19]

Kapanka

[11] Patent Number: 4,645,138
[45] Date of Patent: Feb. 24, 1987

[54] COMPACT SEAT BELT RETRACTOR

[75] Inventor: Harley L. Kapanka, Utica, Mich.

[73] Assignee: General Motors Corporation, Detroit, Mich.

[21] Appl. No.: 818,081

[22] Filed: Jan. 13, 1986

[51] Int. Cl.⁴ .................. A62B 35/02; B65H 75/48
[52] U.S. Cl. .................. 242/107.4 A; 242/107.4 B
[58] Field of Search .................. 242/107.4 B, 107.4 A; 297/478, 480; 280/806

[56] References Cited

U.S. PATENT DOCUMENTS

| | | | |
|---|---|---|---|
| 3,741,496 | 6/1973 | Beller | 242/107.4 A |
| 3,881,667 | 5/1975 | Tandetzke | 242/107.4 A |
| 3,970,265 | 7/1976 | Köpke et al. | 242/107.4 B |
| 3,970,266 | 7/1976 | Doin et al. | 242/107.4 B |

FOREIGN PATENT DOCUMENTS

| | | | |
|---|---|---|---|
| 402147 | 9/1966 | Australia | 242/107.4 A |
| 1005301 | 9/1965 | United Kingdom | 242/107.4 A |
| 2110633 | 6/1983 | United Kingdom | 242/107.4 B |

*Primary Examiner*—John M. Jillions
*Assistant Examiner*—Katherine Matecki
*Attorney, Agent, or Firm*—Charles E. Leahy

[57] ABSTRACT

A belt reel has a reel shaft journaled on the side walls of a retractor frame and a belt spool attached to the reel shaft in radially spaced relation therefrom by round plates which define an annular space between the reel shaft and the spool and opening outwardly toward the frame side walls. An actuator is pivotally mounted on the end of the reel shaft between the sprocket and frame side wall and depends into proximity with a lock bar to move the lock bar into engagement with a reel sprocket upon rotary movement of the actuator. An acceleration sensing mechanism situated within the annular space is cammed axially to drive couple the reel with the actuator in response to a sensed condition of acceleration so that the actuator is rotated and engages the lock bar with the sprocket. The sensing mechanism may be a flywheel drive coupled with the reel for unitary rotation therewith until belt unwinding rotary acceleration causes the flywheel to lag behind rotation of the reel so that a cam thrusts the flywheel axially into engagement with the actuator. The acceleration sensing mechanism may also be a flyweight drive coupled to the reel for rotation therewith but movable axially along the shaft in response to a deceleration of the vehicle so that the flywheel engages with and rotates the actuator to engage the lock bar with the sprocket.

4 Claims, 6 Drawing Figures

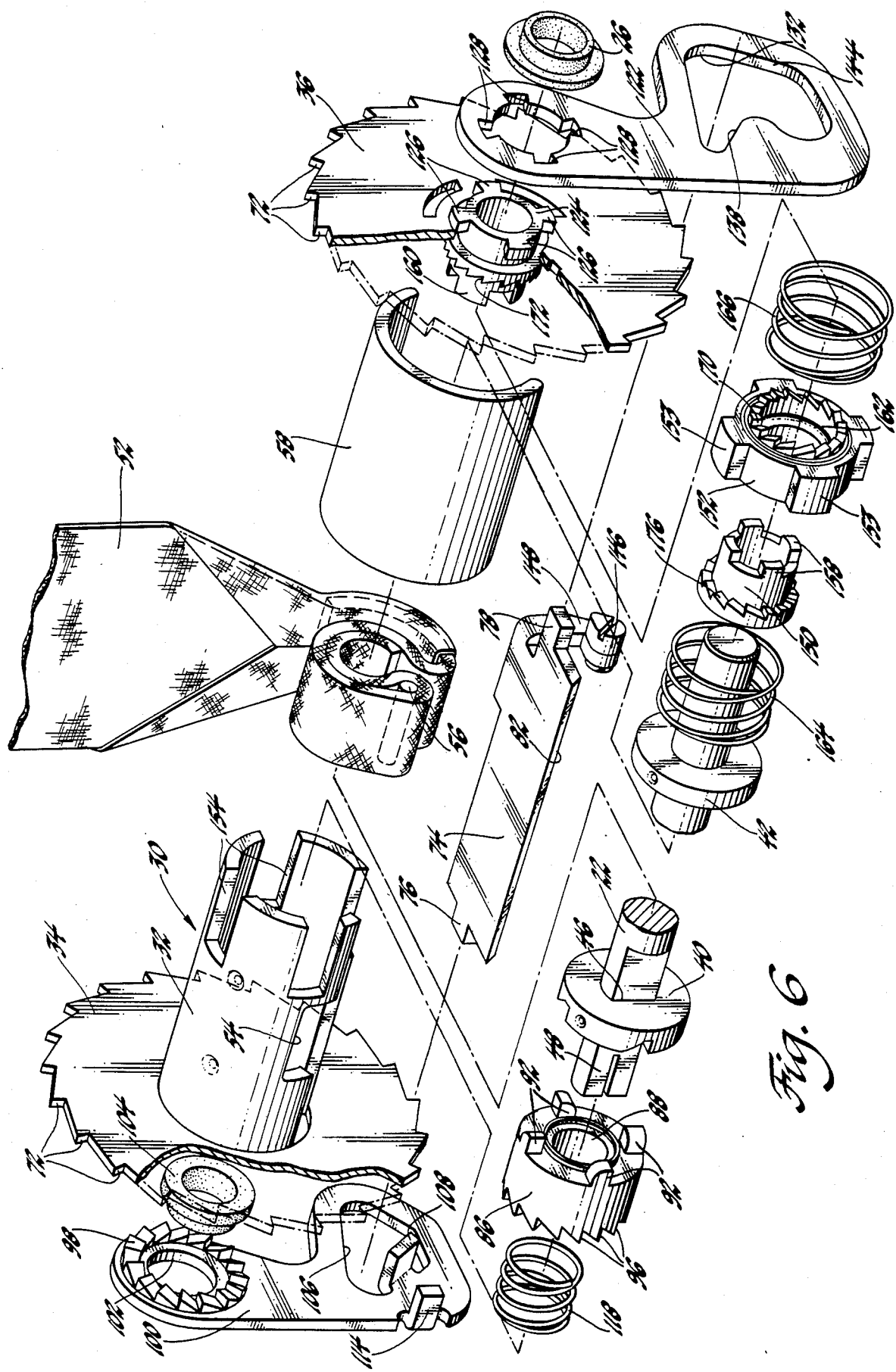

COMPACT SEAT BELT RETRACTOR

The invention relates to a seat belt retractor and more particularly to a compact seat belt retractor in which the vehicle sensitive and belt sensitive mechanisms for locking up the retractor are located inside the reel.

BACKGROUND OF THE INVENTION

Conventional seat belt retractors commonly include a frame including a base wall for attachment to a motor vehicle structure such as a pillar. The frame also has side walls with aligned apertures to receive a reel shaft which rotatably mounts a belt reel. A spring acts between the housing and the reel shaft to bias the reel in the direction to wind up the restraint belt. A lock bar extends between the housing side walls and is movable into engagement with a pair of sprockets carried by the belt reel to lock the reel against belt unwinding rotation.

A sensing mechanism is conventionally provided to lock up the reel by moving the lock bar into engagement with the reel sprockets. The sensing mechanism may be responsive to vehicle deceleration or to the rate of unwinding of belt from the reel. The vehicle sensitive locking mechanism traditionally includes a ball or pendulum which moves relative to the lock bar upon occurrence of a vehicle deceleration condition to move the lock bar to the locked condition. The belt sensitive locking mechanism conventionally includes a flywheel which is carried by the reel and lags behind rotation of the reel in response to a certain condition of belt unwinding to initiate movement of the lock bar to the locked position.

In conventional seat belt retractors the sensing mechanism, whether of the vehicle sensitive locking type or the belt sensitive locking type, is traditionally located on the outside of the frame side walls so that the sensing mechanism increases the overall physical dimensions of the retractor and therefore presents a design constraint to the mounting of the retractor within the motor vehicle. This design constraint is particularly severe in those retractors which employ both a vehicle sensitive locking mechanism and a belt sensitive locking mechanism.

Thus, it would be desirable to provide a seat belt retractor in which the sensing mechanism, whether vehicle sensitive, belt sensitive, or both, is situated entirely inside the reel.

SUMMARY OF THE INVENTION

A seat belt retractor, according to the invention, includes a belt reel having a reel shaft journaled on the side walls of a retractor frame and a belt spool which is attached to the reel shaft in radially spaced relation therefrom by round plates which define an annular space between the reel shaft and the spool which opens outwardly toward the frame side walls. A lock bar pivotally mounted on the frame side walls is movable into engagement with sprockets carried by the reel to lock the reel against belt unwinding rotation. An actuator is pivotally mounted on the end of the reel shaft between the sprocket and frame side wall and depends into proximity with the lock bar to move the lock bar into engagement with the sprocket upon rotary movement of the actuator. An acceleration sensing mechanism surrounds the reel shaft and is situated within the annular space between the reel shaft and the spool and is adapted to effectively drive couple the reel with the actuator in response to a sensed condition of acceleration so that the actuator is rotated and in turn moves the lock bar into locking engagement with the sprocket. The acceleration sensing mechanism may be a flywheel which is drive coupled with the reel by a cam for rotation therewith until a predetermined level of belt unwinding rotary acceleration causes the rotation of the flywheel to lag behind the rotation of the reel so that the cam thrusts the flywheel axially into engagement with the actuator. On the other hand, the acceleration sensing mechanism may be a flyweight drive coupled to the reel by a spline for rotation therewith but movable axially along the shaft in response to a deceleration of the vehicle so that the flywheel engages with the actuator and thereby provides a drive coupling between the reel and the actuator so that a further belt unwinding rotation will rotate the actuator and thereby move the lock bar into the sprocket locking position.

Accordingly, the object, feature and advantage of the invention resides in the provision of a seat belt retractor in which the acceleration sensing mechanism of the belt sensitive or vehicle sensitive type is housed within an annular space defined between the reel shaft and the reel spool and opening outwardly toward the side wall of the retractor frame for engagement with a lock bar actuator mounted on the reel shaft.

BRIEF DESCRIPTION OF THE DRAWINGS

These and other features, objects and advantages of the invention will become apparent upon consideration of the description of the preferred embodiment and the appended drawings in which:

FIG. 6 is an exploded perspective view of the retractor.

DESCRIPTION OF THE PREFERRED EMBODIMENT

Figures 1, 2:
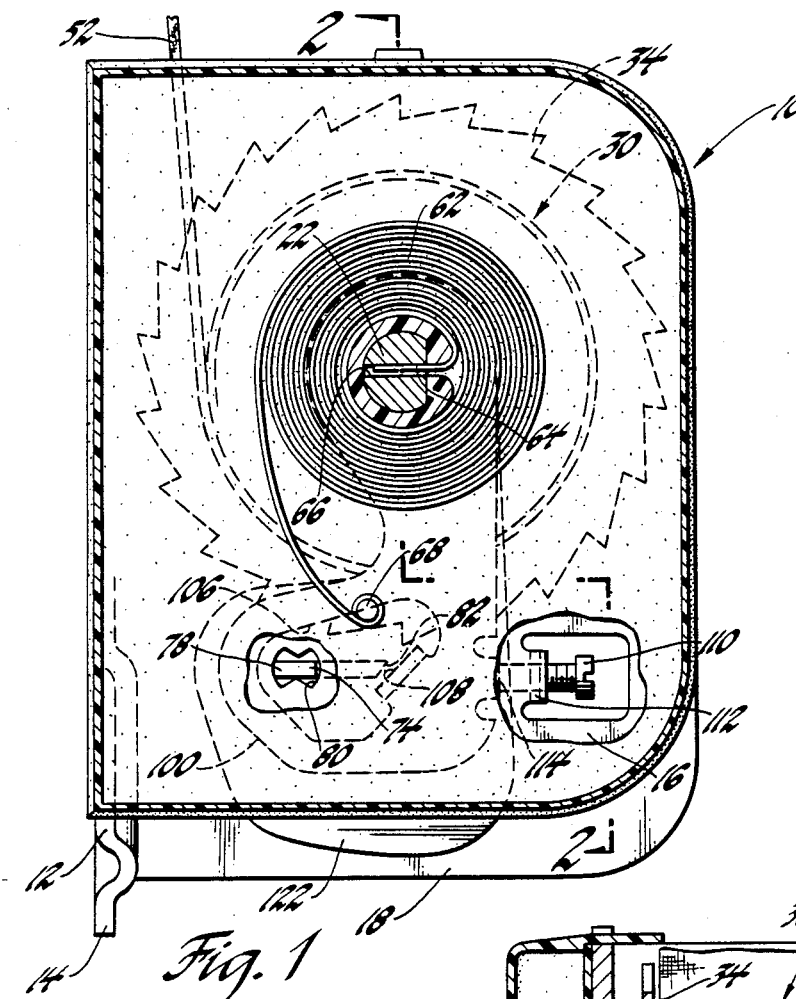
FIG. 1 is a side elevation view of the seat belt retractor.
FIG. 2 is a sectional view taken in the direction of arrows 2—2 of FIG. 1 and having parts broken away and in section.

Referring to FIGS. 1 and 2, a seat belt retractor 10 includes a frame 12 having a base wall 14 adapted for attachment on the vehicle body and having integral spaced apart side walls 16 and 18. A reel shaft 22 extends through aligned apertures in the side walls 16 and 18 and is rotatably journaled by a bearing 24 in the side wall 16 and a bearing 26 in the side wall 18.

A belt reel, generally indicated at 30, is attached to the reel shaft 22. As best seen in FIGS. 2 and 6, the belt reel 30 includes a tubular spool 32 having a left-hand end attached to a toothed sprocket 34 and a right-hand end attached to a toothed sprocket 36. As best seen in FIG. 2, the inside diameter of the spool 32 substantially exceeds the diameter of the reel shaft 22 so that an annular space is defined between the reel shaft 22 and the spool 32. The spool 32 is fixedly attached to the reel shaft 22 by a left-hand cam plate 40 and a right-hand spacer plate 42. As best seen in FIG. 6, the cam plate 40 is round and has a D-shaped central aperture 46 which fits over a flat 48 on the left-hand end of the reel shaft 22 so that the cam plate 40 is nonrotatably coupled with the reel shaft 22. Furthermore the spool 32 is pressed fit, swaged, welded, or otherwise suitably attached to the cam plate 40. The spacerplate 42 is also suitably attached in a nonrotatable manner to both the reel shaft 22 and the spool 32. Accordingly, the cam plate 40 and the spacer plate 42 couple the spool 32 and the reel shaft 22 for unitary rotation. Furthermore, the cam plate 40 defines the inner end wall of a left-hand annular space 49 which opens outwardly toward the frame side wall 16. Likewise, the plate 40 defines the inner end wall of a right-hand annular space 51 which opens outwardly toward the frame side wall 18.

A seat belt 52 has its end doubled over and reaches through a belt slot 54 in the spool 32 where it wraps around the reel shaft 22 as seen in FIG. 2. A retaining pin 56 slips into the doubled over inner end of the belt 52 and is captured between the reel shaft 22 and the spool 32 to fixedly attach the belt 52 to the reel 30. A cover sleeve 58 fits over the spool 32 and the belt 52 is wound in layers on the reel 30 as shown in FIG. 2.

As best seen in FIGS. 1 and 2, the reel 30 is biased in the belt winding direction of rotation by a spiral spring 62 having an inner end 64 seated in a slot 66 of the reel shaft 22 and an outer end anchored on the side wall 16 by an anchor pin 68. The spring 62 acts to bias the belt reel 30 in the belt winding direction of rotation so that the belt 52 is taut about the occupant and retracted on the reel when the belt is unbuckled.

Figure 3:
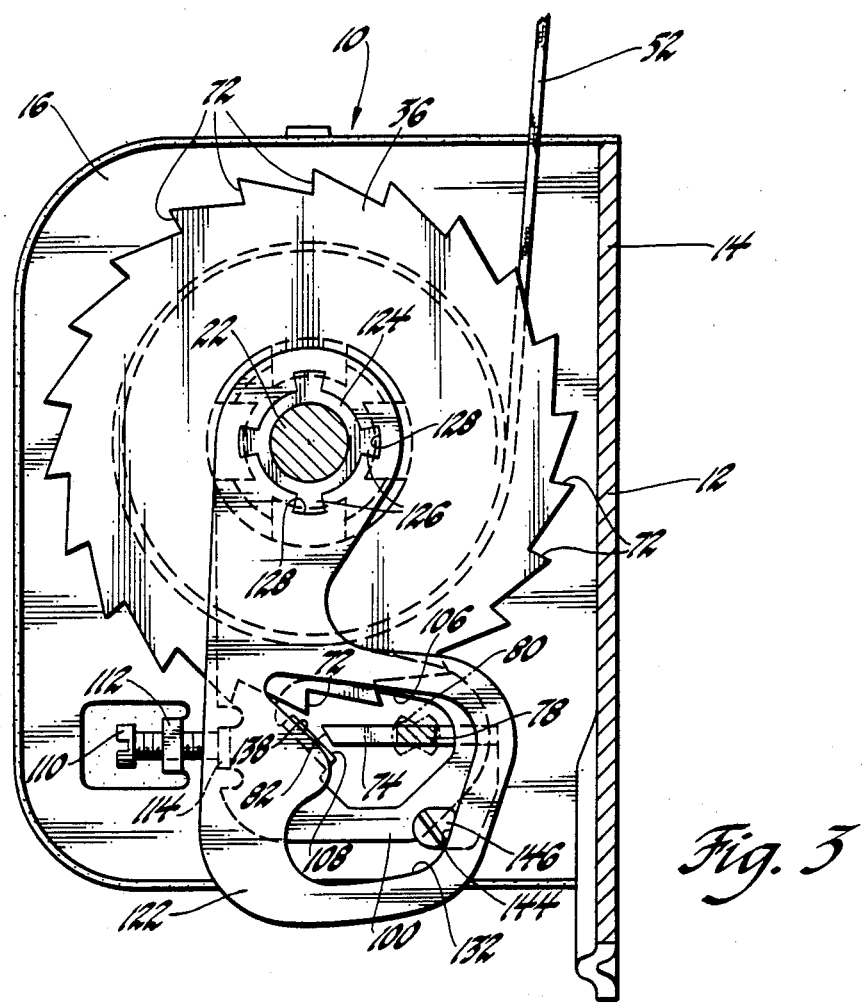
FIG. 3 is a sectional view taken in the direction of arrows 3—3 of FIG. 2.

As best seen in FIGS. 3 and 6, the sprockets 34 and 36 each have a plurality of circumferentially spaced teeth 72 facing in the belt unwinding direction. A lock bar 74 extends between the side walls 16 and 18 and has integral pivot extensions 76 and 78 which fit into bow tie shaped apertures 80 provided in each of the side walls 16 and 18 to mount the lock bar 74 for pivotal movement between a normal position of FIG. 3 in which a locking face 82 of the lock bar 74 is spaced away from the sprocket teeth 72 and a raised position of FIGS. 4 and 5 in which the locking face 82 is engaged with a pair of the sprocket teeth 72.

A belt sensitive mechanism is provided for moving the lock bar 74 to the sprocket engaging position in response to a sensed condition of belt unwinding rotation. The belt sensitive mechanism includes a flywheel 86 which fits within the annular space 49 between the reel shaft 22 and the spool 32. The flywheel 86 has a central round aperture 88 as best seen in FIG. 6 and fits loosely on the reel shaft 22 so that the flywheel 86 is rotatable relative to both the reel shaft 22 and the spool 32. The flywheel 86 has a plurality of circumferentially spaced cam projections 92 on the end face thereof which mate with a plurality of circumferentially spaced cam notches 94 provided in the cam plate 40. The left-hand end face of the flywheel 86 has ratchet teeth 96 which face mating ratchet teeth 98 provided on an actuator 100 as best seen in FIGS. 2 and 6. The actuator 100 has a round aperture 102 which is rotatably mounted on a bushing 104 surrounding the left-hand end of the reel shaft 22. The actuator 100 hangs downwardly from the reel shaft 22 and has a clearance opening 106 therein which straddles the lock bar 74 and an operating tab 108 which is spaced from the locking face 82 of lock bar 74. The precise spacing between the operating tab 108 and the lock bar locking face 82 is set by an adjusting screw 110 as best seen in FIGS. 1 and 2. The adjusting screw is threadedly engaged in a tab 112 struck from the frame side walls 16 and has its end bearing upon an adjusting tab 114 of the actuator 100 to determine the normal rest position of the actuator 100.

A coil compression spring 118 seats on the bushing 104 and urges the flywheel 86 rightwardly as viewed in FIG. 2. During unwinding rotation of the reel 30, the cam plate 40 rotates in the belt unwinding direction with the spool 32 and the reel shaft 22. During such rotation, the mating of the cam projections 92 of the flywheel 86 with the cam notches 94 of the cam plate 40 provide a drive coupling which causes the flywheel 86 to also rotate in the belt unwinding direction of rotation. However, at a predetermined level of acceleration of the reel in the unwinding direction, the inertia of the flywheel 86 will cause its rotation to lag behind the rotation of the cam plate 40 so that the mating angled cam faces of the cam projections 92 and cam face 94 cause the flywheel 86 to move leftwardly along the axis of the reel shaft 22 and carry the ratchet teeth 96 into drive coupling engagement with the ratchet teeth 98 so that the unwinding rotation of the flywheel 86 is transmitted into the actuator 100 which is forcibly rotated in the belt unwinding direction of rotation so that the operating tab 108 engages with the locking face 82 and raises the lock bar 74 to the locked condition in which the locking face 82 engages ratchet teeth 72 and the reel 34 is locked against any further rotation in the belt unwinding direction. When the load is removed from the belt the windup spring 62 will initiate belt reel winding rotation so that the compression spring 118 will return the flywheel 86 rightwardly as permitted by return of the cam projections 92 into the cam notches 94.

Figure 4:
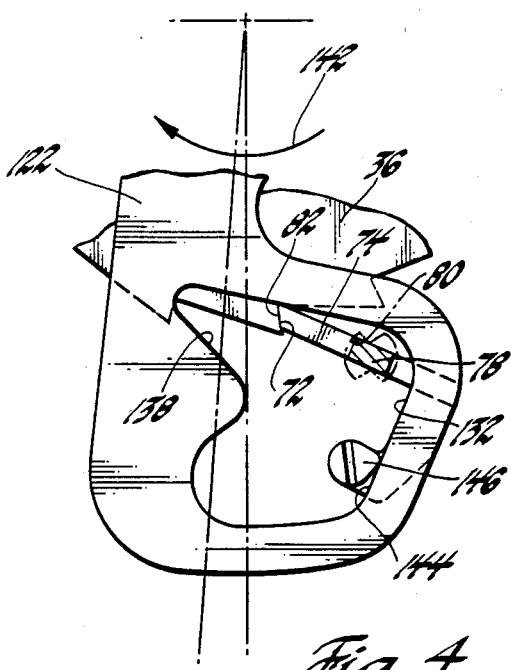
FIG. 4 is a fragmentary view similar to FIG. 3 but showing the lock bar moved to the locked position.
Figure 5:
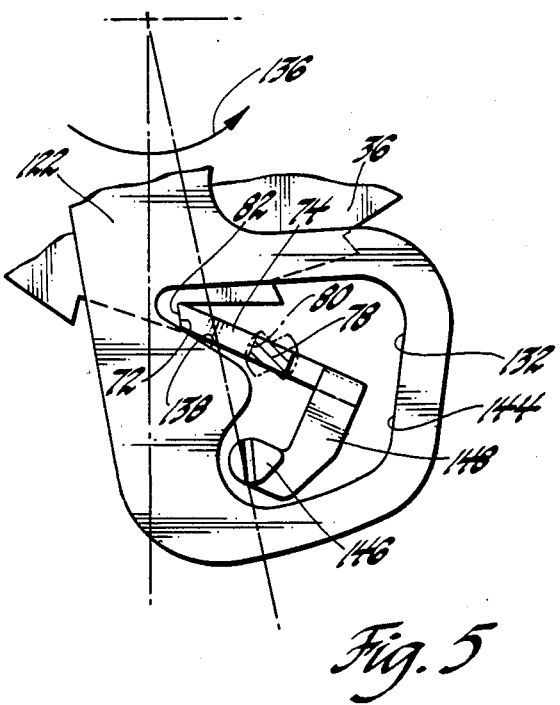
FIG. 5 is a view similar to FIG. 4 and also showing the lock bar moved to the locked position.

The retractor also employs a sensor which senses the rate of vehicle deceleration to actuate the lock bar 74. The vehicle sensitive mechanism includes an actuator 122 which is mounted on an actuator bushing 124. The actuator bushing 124 is journaled on the right-hand end portion of the reel shaft 22 and has teeth 126 which fit within notches 128 in the actuator 122 so that the ratchet bushing 124 and the actuator 122 are locked together for unitary rotation. As best seen in FIG. 6, the actuator 122 has an oversized clearance opening 132 which straddles the lock bar 74 as best seen in FIGS. 3 and 6. The actuator 122 acts as a pendulum which swings in an arc about the reel shaft 22 in the event of a deceleration of the vehicle. Referring to FIG. 5, it is seen that swinging movement of the actuator 122 in the direction of arrow 136 causes a cam face 138 of the clearance opening 132 to engage with the lock bar 74 and raise the lock bar locking face 82 into engagement with the ratchet teeth 72 as shown in FIG. 5. On the other hand, a vehicle deceleration condition acting in the other direction causes the actuator 122 to pivot about the reel shaft 22 in the direction of arrow 142 in FIG. 4 so that a wall portion 144 of the clearance opening 132 engages against a cam head adjusting screw 146 attached to a depending leg 148 of the lock bar 74 so that the lock bar 74 is raised into engagement with the sprocket teeth 72 as shown in FIG. 4. As best seen in FIG. 3, the rotational position of the cam head screw 146 determines the normal position of the lock bar 74. Accordingly, by rotating the cam head screw 146 the normal position of the lock bar 74 can be adjusted.

The vehicle sensor also includes a ratchet bushing 150 and a flyweight 152. As best seen in FIGS. 2 and 6, the ratchet bushing 150 encircles the reel shaft 22 adjacent to the actuator bushing 124 and has lugs 158 which interdigitate with lugs 160 on the actuator bushing 124 so that the actuator bushing 124 and the ratchet bushing 150 are coupled together for unitary rotation. The flyweight 152 has a central aperture which encircles the actuator bushing 124 and the ratchet bushing 150 and is slidable relative thereto by a low friction bushing ring 162 which permits the flyweight 152 to slide back and forth axially, rightwardly and leftwardly, along the reel shaft 22 as viewed in FIG. 2. The flyweight 152 has circumferentially spaced spline lugs 153 which project radially outward through spline slots 154 provided in the spool 32. The spline lugs 153 cooperate with these spline slots 154 to permit the flyweight 152 to move axially along the reel shaft 22 but require that the flyweight 152 rotate in unison with the spool 32 and the reel shaft 22. Coil compression spring 164 acts between the spacer plate 42 and the flyweight 152 to urge the flyweight 152 rightwardly while a similar coil compression spring 166 acts between the sprocket plate 36 and the flyweight 152 to urge the flyweight 152 leftwardly. Thus, the coil compression springs 164 and 166 normally position the flyweight 152 at a centered position shown in FIG. 2 in which ratchet teeth 170 displayed on the right-hand end face of the flyweight 152 are spaced away from mating ratchet teeth 172 provided on the actuator bushing 124. Furthermore, the centered position of the flyweight 152 spaces ratchet teeth 174 on the left-hand end face of the flyweight 152 away from mating ratchet teeth 176 of the ratchet bushing 150.

In the event of a vehicle deceleration stimulus in the direction axially of the reel shaft 22, the flyweight 152 is moved axially as permitted by yielding of the springs 164 and 166. Accordingly, depending on the direction of the deceleration, the ratchet teeth 170 or 174 of the flyweight 152 will lock in drive coupling engagement with the respectively mating ratchet teeth 172 of the actuator bushing 124 or ratchet teeth 176 of the ratchet bushing 150 so that a belt unwinding rotation of the reel which rotates the flyweight 152 will also rotate the ratchet bushing 150 and the actuator bushing 124 and the actuator 122. Accordingly, as best seen in FIG. 3, the counterclockwise belt unwinding rotation of the reel will rotate the actuator 122 in the counterclockwise direction of arrow 136 in FIG. 5 so that the cam face 138 engages the lock bar 74 and raises the lock bar 74 into engagement with the sprocket teeth 72.

Accordingly, it will be appreciated that the lock bar 74 may be moved to the locked position by either a sensed condition of belt unwinding acceleration or a sensed condition of vehicle deceleration. Furthermore, it will be understood that the retractor may have only the belt sensitive mechanism by simply omitting the vehicle sensor. On the other hand, the vehicle sensor may be employed and the belt sensor omitted.

Furthermore, it will be appreciated that both the belt sensitive mechanism and the vehicle sensor mechanism are located within the annular space provided between the reel shaft 22 and the spool 32. Thus, the package size of the retractor 10 is narrower than obtained in more conventional seat belt retractor arrangements in which the web sensing mechanism and the vehicle sensing mechanism are situated on the outside of the side walls 16 and/or 18 of the retractor.

The embodiments of the invention in which an exclusive property or privilege is claimed are defined as follows:

1. A seat belt retractor comprising:
a frame having laterally spaced side walls;
locking reel shaft extending between the side walls and journaled for rotation thereon;
a belt spool attached to the reel shaft in radially spaced relation therefrom to define an annular space between the reel shaft and the spool;
a belt attached to the spool and wound therearound;
a sprocket attached to the spool and the reel shaft for rotation therewith;
a lock bar pivotally mounted on the frame side walls and movable into a engagement with the sprocket to lock the reel against belt unwinding rotation;
an actuator mounted for rotary movement about the reel shaft and including a portion which extends into proximity with the lock bar and having associated means which moves the lock bar into the sprocket locking engaging position upon rotary movement of the actuator about the reel shaft; and
acceleration sensing means surrounding the reel shaft and situated within the annular space between the reel shaft and the spool, which and adapted to effects rotary movement of the actuator in response to a sensed condition of acceleration whereby the actuator is rotated and the lock bar moved to the sprocket locking position.

2. A seat belt retractor comprising:
a frame having laterally spaced side walls;
a belt reel having a shaft extending between the side walls and journaled for rotation thereon and a belt spool attached to the reel shaft in radially spaced relation therefrom to define an annular space between the reel shaft and the spool and opening axially outward toward the frame side wall;
a belt attached to the spool and wound therearound;
a sprocket attached to the belt reel for rotation therewith;
a lock bar pivotally mounted on the frame side walls and movable into locking engagement with the sprocket to lock the reel against belt unwinding rotation;
an actuator mounted for rotary movement about the reel shaft and including a portion which extends into proximity with the lock bar and having associated means which moves the lock bar into the sprocket locking engaging position upon rotary movement of the actuator about the reel shaft; and
a flywheel surrounding the reel shaft and situated within the annular space between the reel shaft and the spool and movably captured for movement axially and rotatably relative to the reel, said flywheel having cam means which drives couples the flywheel with the reel for rotation therewith and shifts the flywheel axially through the annular space opening toward the side wall and into drive coupling engagement with the actuator upon occurrence of a predetermined level of belt unwinding rotary acceleration causing the rotation of the flywheel to lag behind the rotation of the reel whereby a further unwinding rotation of the reel causes the flywheel to rotate the actuator and move the lock bar into the sprocket locking position.

3. A seat belt retractor comprising:
a frame having laterally spaced side walls;
a belt having a reel shaft extending between the side walls and journaled for rotation thereon and a belt spool attached to the reel shaft in radially spaced relation therefrom to define an annular space between the reel shaft and the spool and opening toward the frame side wall;

a belt attached to the spool and wound therearound;

a sprocket attached to the reel for rotation therewith;

a lock bar pivotally mounted on the frame side walls and movable into locking engagement with the sprocket to lock the reel against belt unwinding rotation;

an actuator mounted for rotary movement about the reel shaft and including a portion which extends into proximity with the lock bar and having associated means which moves the lock bar into the sprocket locking engaging position upon rotary movement of the actuator about the reel shaft; and a flyweight surrounding the reel shaft and situated within the annular space between the reel shaft and the spool, said flyweight being splined to the reel for unitary rotation with the reel and for movement axially thereof in response to a predetermined level of vehicle deceleration whereby the flyweight is moved axially into drive coupling engagement with the actuator so that a further unwinding rotation of the reel rotates the actuator to move the lock bar into the sprocket locking position.

4. The seat belt retractor of claim 3 further comprising:

said actuator having integral pendulum means adapted to swing about the reel shaft in response to a sensed condition of vehicle deceleration independently of any rotation thereof induced by the flyweight to thereby move the lock bar into the sprocket locking position.

* * * * *